US012249706B2

(12) United States Patent
Kim et al.

(10) Patent No.: US 12,249,706 B2
(45) Date of Patent: Mar. 11, 2025

(54) SILICON-CARBON COMPOSITE NEGATIVE ELECTRODE ACTIVE MATERIAL, NEGATIVE ELECTRODE INCLUDING SILICON-CARBON COMPOSITE NEGATIVE ELECTRODE ACTIVE MATERIAL, AND SECONDARY BATTERY INCLUDING NEGATIVE ELECTRODE

(71) Applicant: LG Energy Solution, Ltd., Seoul (KR)

(72) Inventors: Tae Gon Kim, Daejeon (KR); Yong Ju Lee, Daejeon (KR); Il Geun Oh, Daejeon (KR); Min Kwak, Daejeon (KR); Je Young Kim, Daejeon (KR); Wang Mo Jung, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 359 days.

(21) Appl. No.: 17/775,742

(22) PCT Filed: Apr. 19, 2021

(86) PCT No.: PCT/KR2021/004891
§ 371 (c)(1),
(2) Date: May 10, 2022

(87) PCT Pub. No.: WO2021/215768
PCT Pub. Date: Oct. 28, 2021

(65) Prior Publication Data
US 2023/0246173 A1    Aug. 3, 2023

(30) Foreign Application Priority Data

Apr. 22, 2020  (KR) ........................ 10-2020-0048937

(51) Int. Cl.
H01M 4/36    (2006.01)
H01M 4/38    (2006.01)
(Continued)

(52) U.S. Cl.
CPC ............ *H01M 4/366* (2013.01); *H01M 4/386* (2013.01); *H01M 4/587* (2013.01); *H01M 4/623* (2013.01);
(Continued)

(58) Field of Classification Search
CPC ...... H01M 4/366; H01M 4/386; H01M 4/587; H01M 4/623; H01M 2004/021
See application file for complete search history.

(56) References Cited

U.S. PATENT DOCUMENTS 6,183,714 B1 *   2/2001   Smalley ................ B82Y 30/00
                                              423/445 B
2005/0100497 A1   5/2005   Smalley et al.
(Continued)

FOREIGN PATENT DOCUMENTS

CN    104854740 A      8/2015
CN    107634184 A  *   1/2018
(Continued)

OTHER PUBLICATIONS

Ebnesajjad, Introduction to Fluoropolymers, 2011, Elsevier Inc., 49-60 (Year: 2011).*
(Continued)

*Primary Examiner* — Maria Laios
*Assistant Examiner* — Ziheng Lu
(74) *Attorney, Agent, or Firm* — Lerner David LLP

(57) ABSTRACT

The present invention relates to a silicon-carbon composite negative electrode active material, a negative electrode including the same, and a secondary battery, wherein the silicon-carbon composite negative electrode active material includes a core containing $SiO_X$ ($0 \leq X < 2$), a carbon layer covering at least a portion of the surface of the core, a carbon nanotube structure positioned on the carbon layer, and a polyvinylidene fluoride coating at least a portion of the
(Continued)

carbon nanotube structure, wherein the carbon nanotube structure has a structure formed by arranging and bonding 2 to 5,000 single-walled carbon nanotube units side by side, and a portion of the carbon nanotube structure is bonded to the carbon layer.

14 Claims, 5 Drawing Sheets

(51) Int. Cl.
  *H01M 4/587* (2010.01)
  *H01M 4/62* (2006.01)
  *H01M 4/02* (2006.01)
(52) U.S. Cl.
  CPC .............. *H01M 2004/021* (2013.01); *H01M 2004/027* (2013.01)

(56) References Cited

U.S. PATENT DOCUMENTS

| | | | |
|---|---|---|---|
| 2006/0008407 A1 | 1/2006 | Smalley et al. | |
| 2010/0159331 A1 | 6/2010 | Lee et al. | |
| 2014/0322611 A1 | 10/2014 | Lee et al. | |
| 2015/0364755 A1* | 12/2015 | Liu | H01M 4/661 252/503 |
| 2017/0047584 A1 | 2/2017 | Hwang et al. | |
| 2017/0062804 A1 | 3/2017 | Son et al. | |
| 2017/0110722 A1 | 4/2017 | Lee et al. | |
| 2018/0013142 A1* | 1/2018 | Kang | H01M 4/049 |
| 2018/0198159 A1* | 7/2018 | Azami | H01M 4/133 |
| 2018/0219212 A1* | 8/2018 | Seol | H01M 4/364 |
| 2019/0036186 A1* | 1/2019 | Kim | H01M 4/8867 |
| 2019/0044133 A1* | 2/2019 | Burshtain | H01M 4/134 |
| 2020/0006772 A1* | 1/2020 | Yu | H01M 4/139 |
| 2021/0020907 A1 | 1/2021 | Kim et al. | |

FOREIGN PATENT DOCUMENTS

| | | |
|---|---|---|
| JP | 2011076948 A | 4/2011 |
| JP | 5663855 B2 | 2/2015 |
| JP | 2017084759 A | 5/2017 |
| JP | 2018190527 A | 11/2018 |
| KR | 20040096203 A | 11/2004 |
| KR | 20100073506 A | 7/2010 |
| KR | 20100138607 A | 12/2010 |
| KR | 20140070406 A | 6/2014 |
| KR | 20150128592 A | 11/2015 |
| KR | 101724196 B1 | 4/2017 |
| KR | 20170044360 A | 4/2017 |
| KR | 101813893 B1 | 1/2018 |
| KR | 101889356 B1 | 8/2018 |
| KR | 20190117387 A | 10/2019 |
| WO | 2019194662 A1 | 10/2019 |

OTHER PUBLICATIONS

International Search Report for Application No. PCT/KR2021/004891 mailed Aug. 3, 2021, 2 pages.

* cited by examiner

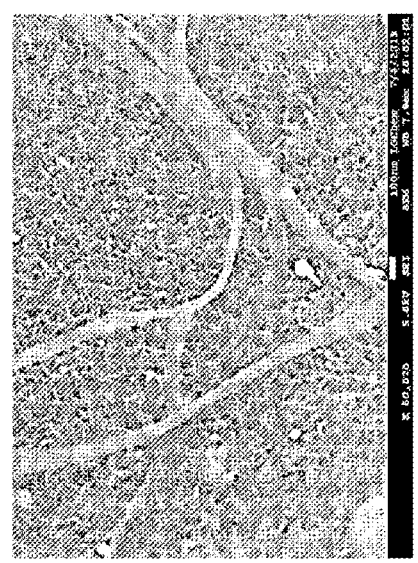
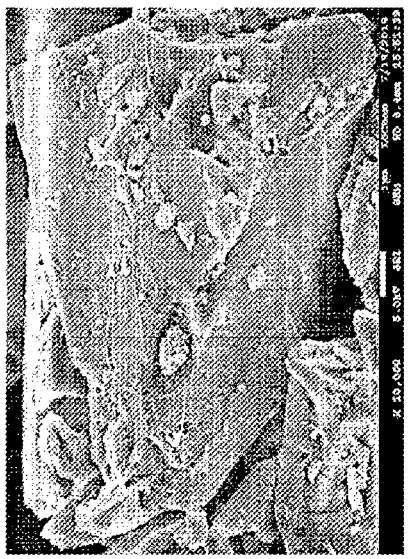
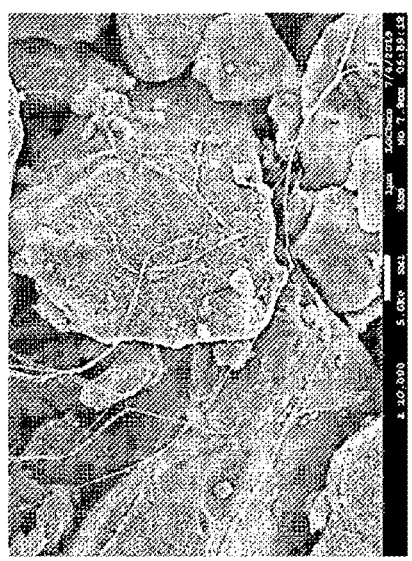
FIG. 3
FIG. 4

SILICON-CARBON COMPOSITE NEGATIVE ELECTRODE ACTIVE MATERIAL, NEGATIVE ELECTRODE INCLUDING SILICON-CARBON COMPOSITE NEGATIVE ELECTRODE ACTIVE MATERIAL, AND SECONDARY BATTERY INCLUDING NEGATIVE ELECTRODE

REFERENCE TO RELATED APPLICATIONS

This application is a national phase entry under U.S.C. § 371 of International Application No. PCT/KR2021/004891, filed on Apr. 19, 2021, which claims the benefit of Korean Patent Application No. 10-2020-0048937, filed on Apr. 22, 2020, in the Korean Intellectual Property Office, the disclosures of which are incorporated herein in its entirety by reference.

TECHNICAL FIELD

The present invention relates to a silicon-carbon composite negative electrode active material, and a negative electrode and a secondary battery including the silicon-carbon composite negative electrode active material, wherein the silicon-carbon composite negative electrode active material includes a core containing $SiO_X$ ($0 \leq X < 2$), a carbon layer covering at least a portion of the surface of the core, a carbon nanotube structure positioned on the carbon layer, and a polyvinylidene fluoride coating at least a portion of the carbon nanotube structure, wherein the carbon nanotube structure has a structure formed by arranging and bonding 2 to 5,000 single-walled carbon nanotube units side by side, and a portion of the carbon nanotube structure is bonded to the carbon layer.

BACKGROUND ART

As technology development and demand for mobile devices have increased in recent years, the demand for secondary batteries as an energy source has been rapidly increased. Accordingly, various studies have been conducted on batteries which may meet various needs. In particular, research has been actively conducted on a lithium secondary battery having high energy density and excellent lifespan and cycle properties as a power source for such devices.

A lithium secondary battery means a battery including a positive electrode containing a positive electrode active material capable of intercalation/deintercalation of lithium ions, a negative electrode containing a negative electrode active material capable of intercalation/deintercalation of lithium ions, and a non-aqueous electrolyte containing lithium ions in an electrode assembly having a microporous separator interposed between the positive electrode and the negative electrode.

Meanwhile, since the conductivity of the negative electrode cannot be secured only with the negative electrode active material, there is a problem in that the resistance of a]the battery is too high. Therefore, typically, the negative electrode additionally includes a conductive material. Typically, a point type conductive material such as carbon black is mainly used, and in order to improve the capacity of the battery by further improving conductivity, a linear conductive material such as a carbon nanotube and a carbon nanofiber is also used.

A single-walled carbon nanotube is one example of the linear conductive material and improves the conductivity in the negative electrode active material layer due to the elongated shape thereof. Therefore, typically, a negative electrode slurry is prepared through a dispersion obtained by completely dispersing the single-walled carbon nanotube, and then a negative electrode active material layer is prepared through the negative electrode slurry.

However, when the charging and discharging of the battery is repeated, the single-walled carbon nanotube is disconnected due to the repeated volume expansion/contraction of the negative electrode active material, so that there is a problem in that it is difficult to maintain the conductive network in the negative electrode active material layer. Particularly, when a silicon-based active material is used as the negative electrode active material in order to improve the capacity of the battery, the volume of the silicon-based active material is excessively increased due to the charging/discharging of the battery, so that the phenomenon in which the single-walled carbon nanotube is disconnected occurs more severely. Accordingly, the conductive network is blocked or reduced, which deteriorates the lifespan properties of the battery. In addition, the single-walled carbon nanotube is present surrounding the surface of the silicon-based active material, and thus, cannot smoothly play the role of conductively connecting adjacent negative electrode active materials to each other.

Therefore, there is a demand for a new method capable of improving the lifespan of a battery when a silicon-based active material is used.

DISCLOSURE OF THE INVENTION

Technical Problem

An aspect of the present invention provides a silicon-carbon composite negative electrode active material capable of improving the lifespan properties of a battery.

Another aspect of the present invention provides a negative electrode including the silicon-carbon composite negative electrode active material.

Another aspect of the present invention provides a secondary battery including the negative electrode.

Technical Solution

According to an aspect of the present invention, there is provided a silicon-carbon composite negative electrode active material including a core containing $SiO_X$ ($0 \leq X < 2$), a carbon layer covering at least a portion of the surface of the core, a carbon nanotube structure positioned on the carbon layer, and a polyvinylidene fluoride coating at least a portion of the carbon nanotube structure, wherein the carbon nanotube structure has a structure formed by arranging and bonding 2 to 5,000 single-walled carbon nanotube units side by side, and a portion of the carbon nanotube structure is bonded to the carbon layer.

According to another aspect of the present invention, there is provided a negative electrode including the silicon-carbon composite negative electrode active material.

According to yet another aspect of the present invention, there is provided a secondary battery including the negative electrode.

Advantageous Effects

A silicon-carbon composite negative electrode active material according to the present invention includes carbon nanotube structures (in a long fiber form) of a rope form in which multiple single-walled carbon nanotube units are arranged side by side and bonded to each other, and the carbon nanotube structures have a long and thick shape, so that even with the volume expansion of the silicon-carbon composite negative electrode active material when a battery is driven, a conductive network in a negative electrode may be more firmly maintained without being disconnected. In addition, a part of the carbon nanotube structure is connected to one silicon-carbon composite negative electrode active material, and the other part thereof is connected to another adjacent silicon-carbon composite negative electrode active material, so that it is possible to conductively and effectively connect silicon-carbon composite negative electrode active materials. Accordingly, a long conductive network may be formed in the negative electrode. Furthermore, due to the fact that the silicon-carbon composite negative electrode active material includes a carbon layer and that a portion of the carbon nanotube structure may be firmly bonded to the carbon layer by crystallized polyvinylidene fluoride, when a carbon-based negative electrode active material is used in combination with the silicon-carbon composite negative electrode active material, the carbon nanotube structure may be prevented from being present adsorbed only to the carbon-based negative electrode active material, and accordingly, the conductive network may be more efficiently and uniformly formed in the negative electrode. As a result, the lifespan of a battery may be improved due to the above effects.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

FIG. 3 includes SEM photographs of a negative electrode of Example 3;

FIG. 4 includes SEM photographs of a negative electrode of Comparative Example 1;

BEST MODE FOR CARRYING OUT THE INVENTION

Figure 1:
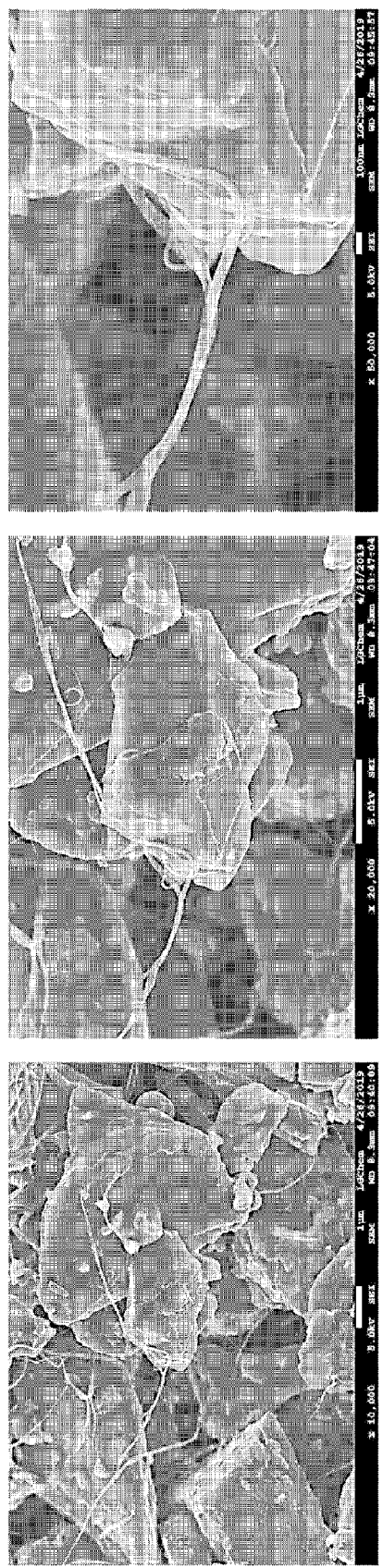
FIG. 1 and FIG. 2 are SEM photographs of a negative electrode of Example 1.

It will be understood that words or terms used in the specification and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

The terminology used herein is for the purpose of describing particular exemplary embodiments only and is not intended to be limiting of the present invention. The terms of a singular form may include plural forms unless the context clearly indicates otherwise.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

In the present specification, "%" means wt % unless otherwise noted.

In the present specification, "specific surface area" is measured by a BET method, and specifically, may be calculated from the adsorption amount of nitrogen gas under a liquid nitrogen temperature (77K) using Belsorp-mini II of BEL Japan Co., Ltd.

In the present specification, an average particle diameter ($D_{50}$) may be defined as a particle diameter corresponding to 50% of the volume accumulation in a particle diameter distribution curve of a particle. The average particle diameter ($D_{50}$) may be measured by, for example, a laser diffraction method. The laser diffraction method generally enables measurement of a particle diameter from a sub-micron region to several millimeters, so that results of high reproducibility and high resolution may be obtained.

Hereinafter, the present invention will be described in more detail.

Silicon-Carbon Composite Negative Electrode Active Material

A silicon-carbon composite negative electrode active material according to the present invention includes a core containing $SiO_X(0 \leq X<2)$, a carbon layer covering at least a portion of the surface of the core, a carbon nanotube structure positioned on the carbon layer, and a polyvinylidene fluoride coating at least a portion of the carbon nanotube structure, wherein the carbon nanotube structure has a structure formed by arranging and bonding 2 to 5,000 single-walled carbon nanotube units side by side, and a portion of the carbon nanotube structure may be bonded to the carbon layer.

The core may contain $SiO_X$ ($0 \leq X<2$). The $SiO_X$ ($0 \leq X<2$) may specifically be SiO. Since the core contains $SiO_X$ ($0 \leq X<2$), the capacity of a battery may be improved.

The average particle diameter ($D_{50}$) of the core may be 0.1 μm to 20 μm, specifically 1 μm to 10 μm. When the above range is satisfied, a side reaction between the core and an electrolyte solution may be suppressed, and since a lithium silicate formation reaction may be suppressed, the initial efficiency of the battery may be improved and the initial capacity of the battery may be increased.

The carbon layer may be positioned on the core. The carbon layer may be disposed on the surface of the core and may cover at least a portion of the surface of the core.

The carbon layer may include at least any one of crystalline carbon and amorphous carbon. Specifically, the carbon layer may include amorphous carbon. The amorphous carbon may appropriately maintain the strength of the coating layer to suppress the expansion of the core.

The amorphous carbon may be at least any one carbide selected from the group consisting of tar, pitch, and other organic materials, or a hydrocarbon. Specifically, the amorphous carbon may be formed by mixing and stirring at least one selected from the group consisting of tar, pitch, and other organic materials in a solvent such as tetrahydrofuran (THF), and then carbonizing the mixture in an inert atmosphere, or by using a hydrocarbon as a source of chemical vapor deposition.

The carbide of the other organic materials may be a carbide of an organic material selected from the group consisting of sucrose, glucose, galactose, fructose, lactose, mannose, ribose, aldohexose or ketohexose carbides and combinations thereof.

The hydrocarbon may be substituted or unsubstituted aliphatic or alicyclic hydrocarbon, or substituted or unsubstituted aromatic hydrocarbon. Aliphatic or alicyclic hydrocarbon of the substituted or unsubstituted aliphatic or alicyclic hydrocarbon may be methane, ethylene, acetylene, propane, butane, butene, pentene, isobutene or hexane, and the like. Aromatic hydrocarbon of the substituted or unsubstituted aromatic hydrocarbon may be benzene, toluene, xylene, styrene, ethylbenzene, diphenylmethane, naphthalene, phenol, cresol, nitrobenzene, chlorobenzene, indene, coumarone, pyridine, anthracene, or phenanthrene, and the like.

The carbon layer may be included in the silicon-carbon composite negative electrode active material in an amount of 0.1 parts by weight to 20 parts by weight, preferably 0.1 parts by weight to 10 parts by weight, more preferably 0.1 parts by weight to 5 parts by weight based on 100 parts by weight of the core. When the above range is satisfied, excessive volume expansion of the silicon-carbon composite negative electrode active material may be suppressed, and the capacity and lifespan of the battery may be improved due to the improvement of conductivity of a negative electrode active material layer.

The carbon layer may coat the entire surface of the core, or may coat only a portion of the surface of the core. Particularly, when the carbon layer coats only a portion of the surface of the core, and thus, a carbon layer having a rough morphology is formed on the surface of the core, the diffusion of lithium ions may be improved. In addition, in this case, even when the battery is repeatedly charged and discharged, the destruction of a carbon layer due to changes in volume of the core may be minimized, so that the capacity and lifespan of the battery may be improved.

The carbon nanotube structure may include a plurality of single-walled carbon nanotube units. Specifically, the carbon nanotube structure may be a carbon nanotube structure in which 2 to 5,000 single-walled carbon nanotube units are bonded to each other side by side. More specifically, the carbon nanotube structure may be a carbon nanotube structure in which 2 to 4,500 single-walled carbon nanotube units are bonded to each other. Even more specifically, when considering the dispersibility of the carbon nanotube structure and the durability of an electrode, the carbon nanotube structure is most preferably a carbon nanotube structure in which 2 to 500 single-walled carbon nanotube units are bonded to each other.

In the carbon nanotube structure, the single-walled carbon nanotube units may be arranged and coupled side by side (a cylindrical structure in which long axes of the units are bonded in parallel to each other, thereby having flexibility) to form the carbon nanotube structure. In the electrode, the carbon nanotube structures may be connected to each other and represents a network structure.

Typical negative electrodes including carbon nanotubes are generally manufactured by dispersing a bundle-type or entangled-type carbon nanotube (a form in which or single-walled carbon nanotube units or multi-walled carbon nanotube units are attached to each other or entangled with each other) in a dispersion medium to prepare a conductive material dispersion, and then using the conductive material dispersion. At this time, the carbon nanotube is completely dispersed in a typical conductive material dispersion and becomes present as a conductive material dispersion in which carbon nanotube units of a single strand form are dispersed. In the typical conductive material dispersion, the carbon nanotube units are easily cut due to an excessive dispersion process, and thus, becomes shorter than in the beginning. In addition, the carbon nanotube units may be easily cut during a roll-pressing process of a negative electrode as well, and there is an additional problem in that the carbon nanotube units (particularly, single-walled carbon nanotube units) are cut due to an excessive volume change of the silicon-carbon composite negative electrode active material when a battery is driven. Accordingly, the conductivity of the negative electrode is degraded, so that there is a problem in that the lifespan properties of the battery are degraded. Moreover, multi-walled carbon nanotube units are highly defective in structure due to a node growing mechanism (rather than being smoothly linear, there are nodes caused by defects occurring during a growth process). Accordingly, during a dispersion process, the multi-walled carbon nanotube units are more easily cut, and the multi-walled carbon nanotube units cut short are likely to aggregate with each other by n-n stacking caused by carbon in the unit. Accordingly, it is difficult for the carbon nanotube units to be uniformly dispersed and present.

On the contrary, the carbon nanotube structure included in the silicon-carbon composite negative electrode active material of the present invention has a rope form in which 2 to 5,000 single-walled carbon nanotube units maintaining high crystallinity while having relatively no structural defects are bonded to each other side by side, and thus, maintains its length without being cut despite the excessive volume change of silicon-carbon composite particles, so that the conductivity of a negative electrode may be maintained. In addition, due to high conductivity of the single-walled carbon nanotube units having high crystallinity, the conductivity of the negative electrode may be increased to greatly improve the input properties, output properties, and lifespan properties of a battery. In addition, the carbon nanotube structures may have a network structure by being connected to each other in the negative electrode, and thus, may suppress the excessive volume change of the silicon-carbon composite negative electrode active material to prevent the generation of cracks, and at the same time, a strong conductive network may be secured. In addition, even when there is a crack in the silicon-carbon composite negative electrode active material, the carbon nanotube structure connects the silicon-carbon composite negative electrode active material across the crack, so that the conductive network may be maintained. Furthermore, since the carbon nanotube structure may maintain a long shape without being easily disconnected, the conductive network may be enhanced throughout the negative electrode active material layer. In addition, the deintercalation of the silicon-carbon composite negative electrode active material is suppressed, so that electrode adhesion force may be greatly improved.

In the carbon nanotube structure, the average diameter of the single-walled carbon nanotube units may be 0.5 nm to 10 nm, specifically 1 nm to 9 nm. When the above average diameter is satisfied, there is an effect of maximizing the conductivity in the negative electrode even with a minimal amount of a conductive material. The average diameter corresponds to an average value of the diameters of the top 100 single-walled carbon nanotube units having a larger diameter and the bottom 100 single-walled carbon nanotube units having a smaller diameter when a manufactured negative electrode is observed through a TEM.

The single-walled carbon nanotube units may be included in the carbon nanotube structure in an amount of 95 wt % to 100 wt %, specifically 100 wt %. In other words, the carbon nanotube structure does not include a double-walled carbon nanotube unit and multi-walled carbon nanotube unit, and thus, the silicon-carbon composite negative electrode active material does not include a double-walled carbon nanotube unit and a multi-walled carbon nanotube unit, also. Accordingly, the conductive network of the silicon-carbon composite negative electrode active material may be formed having a high durability, and when a separate conductive material is used, the conductivity of the negative electrode active material layer may be effectively improved even with a small amount of the conductive material.

In the carbon nanotube structure, the average length of the single-walled carbon nanotube units may be 1 μm to 100 μm, specifically 5 μm to 50 μm. When the above average length is satisfied, a long conductive path for conductive connection between the silicon-carbon composite negative electrode active materials may be formed, and a unique network structure may be formed, so that there is an effect of maximizing the conductivity in the negative electrode even with a minimal amount of a conductive material. The average length corresponds to an average value of the lengths of the top 100 single-walled carbon nanotube units having a larger length and the bottom 100 single-walled carbon nanotube units having a smaller length when a manufactured negative electrode is observed through a TEM.

The specific surface area of the single-walled carbon nanotube units may be 500 $m^2/g$ to 1,000 $m^2/g$, specifically 600 $m^2/g$ to 800 $m^2/g$. When the above range is satisfied, a conductive path may be smoothly secured in a negative electrode due to a large specific surface area, so that there is an effect of maximizing the conductivity in the negative electrode even with a minimal amount of a conductive material. The specific surface area of the single-walled carbon nanotube units may be calculated from the adsorption amount of nitrogen gas at a liquid nitrogen temperature (77 K) using Belsorp-mino II of BEL Japan Co., Ltd.

The average diameter of the carbon nanotube structures may be 2 nm to 200 nm, specifically 5 nm to 150 nm, more specifically 50 nm to 120 nm. When the above range is satisfied, it is effective in forming a conductive network structure, and it is advantageous in connecting between silicon-carbon composite negative electrode active materials, so that excellent electrical conductivity may be implemented. The average diameter corresponds to an average value of the diameters of the top 100 carbon nanotube structures having a larger diameter and the bottom 100 carbon nanotube structures having a smaller diameter when a manufactured negative electrode is observed through a TEM.

The average length of the carbon nanotube structures may be 1 μm to 100 μm, specifically 5 μm to 50 μm. When the above range is satisfied, it is effective in forming a conductive network structure, and it is advantageous in connecting between active materials, so that excellent electrical conductivity may be implemented. The average length corresponds to an average value of the lengths of the top 100 carbon nanotube structures having a larger length and the bottom 100 carbon nanotube structures having a smaller length when a manufactured negative electrode is observed through a SEM.

The carbon nanotube structure may be position on the carbon layer. Specifically, a portion of the carbon nanotube structure may be bonded to the carbon layer. The bonding may be achieved by the crystallized polyvinylidene fluoride. Specifically, the polyvinylidene fluoride coats at least a portion of the carbon nanotube structure, and the carbon nanotube structure coated with the polyvinylidene fluoride comes into contact with the carbon layer, so that the carbon nanotube structure and the carbon layer may be bonded with the polyvinylidene fluoride therebetween.

The portion of the carbon nanotube structure may be bonded to the carbon layer. When there is no carbon layer on the surface of the core, the carbon nanotube structure is not connected to the core by being bonded thereto, so that the carbon nanotube structure is present surrounding the core without being bonded to the core in the negative electrode. In that case, it is difficult for the carbon nanotube structure to electrically connect adjacent silicon-carbon composite negative electrode active materials, and even if the active materials are connected, the length of the conductive network thereof is inevitably shortened.

On the other hand, in the present invention, a portion of the carbon nanotube structure is firmly bonded to the carbon layer, and the other portion thereof except for the portion of the carbon nanotube structure bonded to the carbon layer may be present protruding from the silicon-carbon composite negative electrode active material. Since the silicon-carbon composite negative electrode active material includes a carbon layer, a portion of a carbon nanotube structure in a long rope form is strongly bonded to the carbon layer by a n-n action, and the other portion of the carbon nanotube structure is strongly bonded to a carbon layer of another adjacent silicon-carbon composite negative electrode active material by the n-n action. Therefore, the other portion thereof except for the portion of the carbon nanotube structure bonded to the carbon layer may be present protruding from the silicon-carbon composite negative electrode active material. Accordingly, the carbon nanotube structure may strongly form a long conductive network without being present surrounding a silicon-carbon composite negative electrode active material, so that the capacity and lifespan of a battery may be greatly improved even with the repeated charging/discharging of the battery.

The number of the carbon nanotube structure included in the silicon-carbon composite negative electrode active material is 1 to 100, specifically 1 to 50, more specifically 1 to 20. Here, being included does not mean simply being in contact, but means that the carbon nanotube structure is bonded to the carbon layer by the polyvinylidene fluoride. This may be measured by observing 500 or more silicon-carbon composite negative electrode active materials in a negative electrode with an SEM, and then measuring the number of carbon nanotube structures bonded to a silicon-carbon composite negative electrode active material per each silicon-carbon composite negative electrode active material, followed by calculating the average thereof.

The carbon nanotube structure may be included in an amount of 0.05 parts by weight to 5.0 parts by weight, specifically 0.05 parts by weight to 3.0 parts by weight, more specifically 0.05 parts by weight to 1.0 part by weight based on 100 parts by weight of the core having the carbon layer formed thereon. When the above range is satisfied, a conductive network in a negative electrode active material layer may be highly durable even with a small amount of carbon nanotube structure. When preparing a conductive material dispersion for including the carbon nanotube structure in the silicon-carbon composite negative electrode active material, in the case of completely dispersing a bundle-type carbon nanotube (dispersing carbon nanotube units of a single strand to be separated from each other as much as possible by a common dispersion method), the carbon nanotube structure is not generated, or generated in a minimal amount (0.0025 parts by weight or less) if generated by accident. That is, it is impossible to achieve the above content range by a common method.

In the case of the prior art in which a negative electrode includes a multi-walled carbon nanotube unit as a conductive material, in order to compensate for a low conductivity of the multi-walled carbon nanotube unit, it is necessary to use the multi-walled carbon nanotube unit in a high content. Also, when a negative electrode is manufactured through a conductive material dispersion in which a single-walled carbon nanotube units are completely dispersed, due to the problem in which the single-walled carbon nanotube units are cut, it is not possible to use the single-walled carbon nanotube units in a low content.

On the other hand, a carbon nanotube surface included in the silicon-carbon composite negative electrode active material of the present invention has a form in which 2 to 5,000 single-walled carbon nanotube units are bonded to each other side by side. Therefore, even with the excessive volume change of the silicon-carbon composite negative electrode active material, the carbon nanotube unit may smoothly maintain its length without being cut. Accordingly, the conductivity of a negative electrode may be maintained, and due to the high conductivity of a single-walled carbon nanotube unit, the conductivity of the negative electrode may be smoothly ensured. Accordingly, even though the content of carbon nanotube structure in the silicon-carbon composite negative electrode active material is low, the capacity and lifespan properties of a battery may be excellent.

Meanwhile, in some cases, the single-walled carbon nanotube unit may be surface-treated through oxidation treatment or nitration treatment to improve affinity with a dispersant.

The polyvinylidene fluoride serves to bond a portion of the carbon nanotube structure to the carbon layer.

The polyvinylidene fluoride may coat at least a portion of the carbon nanotube structure. The carbon layer and the carbon nanotube structure may be firmly bonded having the polyvinylidene fluoride therebetween. Specifically, the polyvinylidene fluoride may be bonded to the carbon layer and the carbon nanotube structure.

The polyvinylidene fluoride may be present in a crystallized state in the silicon-carbon composite negative electrode active material. For example, unlike the present invention, when a core having a carbon layer on the surface thereof, a carbon nanotube structure, polyvinylidene fluoride are simply mixed, the carbon nanotube structure is not bonded to the carbon layer, and it is highly likely that the carbon nanotube structures are aggregated to each other or are present only on a portion of the surface of the carbon layer. In addition, polyvinylidene fluoride is present concentrated only on the aggregated carbon nanotube structures, or is present in the form of a kind of film on the surface of the carbon layer.

On the contrary, in the present invention, in a manufacturing process of the silicon-carbon composite negative electrode active material, a dispersion solution including polyvinylidene fluoride, which may serve as a dispersant and a binder, and a carbon nanotube structure is prepared, and then the core having a carbon layer on the surface thereof is mixed and dispersed in the dispersion solution, followed by crystallizing the polyvinylidene fluoride. Therefore, the carbon nanotube structure may be positioned firmly bonded to the carbon layer by the crystallized polyvinylidene fluoride. Accordingly, even during repeated charging and discharging processes of a battery, a conductive network formed by the carbon nanotube structure may have tight durability enough to be sufficiently maintained. Accordingly, the capacity and lifespan of the battery may be improved.

Here, the crystallization of polyvinylidene fluoride will be further described. Polyvinylidene fluoride corresponds to a thermoplastic resin, and has both an amorphous region and a crystalline region. The more the crystalline regions, polyvinylidene fluoride may not be easily disconnected or deformed even when there is external stress. When polyvinylidene fluoride is applied with an appropriate level of heat, crystallization is sufficiently achieved centered around crystal nuclei in the polyvinylidene fluoride, and when gradually cooled, the number of crystal nuclei having chemical resistance increases and the degree of crystallization may increase. Accordingly, the crystalline region increases and polyvinylidene fluoride changes so as to be able to withstand external stress, so that the carbon nanotube structure and the carbon layer may be firmly bonded by the polyvinylidene fluoride.

In addition, unlike a positive electrode active material which is vulnerable to moisture, a silicon-based active material may typically prepare a negative electrode slurry through an aqueous dispersion process which is environmentally friendly and inexpensive. In the aqueous dispersion process, when uncrystallized polyvinylidene fluoride is introduced to water, which is solvent, the uncrystallized polyvinylidene fluoride is immediately gelled in a negative electrode slurry, so that it is difficult to manufacture a negative electrode. This is because when uncrystallized polyvinylidene fluoride reacts with water which has polarity, a chain-shaped $-(CH_2-CF_2)_n-$ structure reacts with the same structure nearby, so that HF is easily deintercalated to allow chains of the polyvinylidene fluoride to crosslink each other, causing a gelation reaction to occur. That is, when typical uncrystallized polyvinylidene fluoride is included in a negative electrode active material, it is difficult to apply an aqueous dispersion process in which a negative electrode slurry is prepared through water, and it is apparent that it is also difficult to use an aqueous binder such as SBR and CMC together with typical uncrystallized polyvinylidene fluoride.

However, polyvinylidene fluoride included in the silicon-carbon composite negative electrode active material of the present invention may be crystallized polyvinylidene fluoride, so that the problem of gelation does not occur even in an aqueous dispersion process. In other words, the present invention is different from other techniques in that a silicon-carbon composite negative electrode active material which requires aqueous dispersion may include polyvinylidene fluoride. The crystallization of the polyvinylidene fluoride may be easily identified by whether gelation occurs during the preparation of a negative electrode slurry.

The weight average molecular weight of the polyvinylidene fluoride may be 10,000 g/mol to 1,000,000 g/mol, specifically 100,000 g/mol to 900,000 g/mol. When the above range is satisfied, the formation of the carbon nanotube structure is facilitated, and the dispersibility of the carbon nanotube structure in a conductive material dispersion may be improved.

The polyvinylidene fluoride may be included in an amount of 0.1 parts by weight to 30 parts by weight, specifically 0.1 parts by weight to 20 parts by weight, more specifically 0.1 parts by weight to 10 part by weight based on 100 parts by weight of the core having a carbon layer formed thereon. When the above range is satisfied, the carbon nanotube structure is uniformly dispersed on the core having a carbon layer, and the carbon nanotube structure may be firmly fixed on the carbon layer. Accordingly, the carbon nanotube structure is not easily deintercalated during a preparation process of a negative electrode slurry, and a conductive network is effectively formed, so that the capacity and lifespan of a battery may be greatly improved.

In order to improve the affinity with a carbon nanotube structure, the polyvinylidene fluoride may include a modified polyvinylidene fluoride modified with a functional group, specifically a hydrophilic functional group. Specifically, the polyvinylidene fluoride may include a modified polyvinylidene fluoride containing at least one functional group of an acid functional group and an ester functional group. The functional groups of the modified polyvinylidene fluoride interact with a single-walled carbon nanotube unit in the carbon nanotube structure, so that the carbon nanotube structure may be formed to have a suitable diameter. In addition, the functional group allows the carbon nanotube structure to be uniformly dispersed well on the entire core having a carbon layer, and enhances the adhesion force between the core having the carbon layer and the carbon nanotube structure.

The functional group may be included in the modified polyvinylidene fluoride in an amount of 0.1 wt % to 5 wt %, specifically 0.3 wt % to 3 wt %. When the above range is satisfied, the carbon nanotube structure may be formed to have a suitable diameter. In addition, the functional group allows the carbon nanotube structure to be uniformly dispersed well on the entire core having a carbon layer, and enhances the adhesion force between the core having the carbon layer formed thereon and the carbon nanotube structure.

The modified polyvinylidene fluoride may be included in an amount of 1 wt % to 100 wt %, specifically 1 wt % to 50 wt %, more specifically, 1 wt % to 20 wt % based on a total weight of the polyvinylidene fluoride. When the above range is satisfied, the carbon nanotube structure may be uniformly and firmly bonded on the core having a carbon layer formed thereon.

The specific surface area of the silicon-carbon composite negative electrode active material may be 0.5 m$^2$/g to 50 m$^2$/g, specifically 0.5 m$^2$/g to 30 m$^2$/g, more specifically 3 m$^2$/g to 30 m$^2$/g. When the above range is satisfied, battery performance may be maintained even with a low content of a conductive material and a binder, side reactions in a batter is reduced, and the capacity and lifespan of the battery may be improved. Furthermore, when the specific surface area of the silicon-carbon composite negative electrode active material is 3 m$^2$/g to 30 m$^2$/g, it means that the carbon layer does not cover the entire surface of the core, but covers a portion thereof, and that the surface of the silicon-carbon composite negative electrode active material is in the form of irregularities and rough. Accordingly, even during repeated charging and discharging processes of a battery, the destruction of the carbon layer may be reduced, and the firm bonding between the carbon layer and the carbon nanotube structure may be maintained, so that a conductive network in the silicon-carbon composite negative electrode active material and in the negative electrode active material layer may become firm, and the capacity and lifespan of the battery may be improved.

Method for Preparing Silicon-Carbon Composite Negative Electrode Active Material A method for manufacturing a silicon-carbon composite negative electrode active material according to another aspect of the present invention may include (a) forming a carbon layer on a core containing SiO$_X$ (0≤X<2), (b) preparing a carbon nanotube structure dispersion including a carbon nanotube structure and polyvinylidene fluoride, (c) mixing the carbon nanotube structure dispersion and the core having the carbon layer, and (d) bonding the carbon nanotube structure to the carbon layer.

Here, the core, the carbon layer, the carbon nanotube structure are the same as one described in the embodiment about a silicon-carbon composite negative electrode active material described above. Also, the order of (a) and (b) may be changed.

In Step (a), the carbon layer includes crystalline carbon or amorphous carbon positioned on the core. The amorphous carbon may be at least any one carbide selected from the group consisting of tar, pitch, and other organic materials, or a carbon-based material formed by using hydrocarbon as a source of chemical vapor deposition. The carbon-based material is the same as described with respect to the embodiment described above.

In Step (b), the preparation of the carbon nanotube structure dispersion may include (b-1) of introducing a bundle-type carbon nanotube and polyvinylidene fluoride into a dispersion medium to prepare a mixture, and (b-2) of performing sonification on the mixture to form a carbon nanotube structure. The bundle-type carbon nanotube is in which the above-described single-walled carbon nanotube units are bonded in a bundle form, and usually includes two or more, substantially 500 or more, for example 5,000 or more of single-walled carbon nanotube units.

In Step (b-1), the bundle-type carbon nanotube may be included in the mixture in an amount of 0.1 wt % to 1.0 wt %, specifically 0.2 wt % to 0.5 wt %. When the above range is satisfied, the bundled carbon nanotube is dispersed to a suitable level, so that a carbon nanotube structure of an appropriate level may be formed, and dispersion stability may be improved.

The polyvinylidene fluoride may be included in the mixture in an amount of 0.1 wt % to 20 wt %, specifically 1 wt % to 10 wt %. When the above range is satisfied, the bundled carbon nanotube is dispersed to a suitable level, so that a carbon nanotube structure of an appropriate level may be formed, and dispersion stability may be improved.

The polyvinylidene fluoride is the same as the polyvinylidene fluoride of the embodiment described above, but is not yet crystallized in Step (b).

In the mixture, the weight ratio of the bundle-type carbon nanotube and the polyvinylidene fluoride may be 1:0.1 to 1:10, specifically 1:1 to 1:10. When the above range is satisfied is satisfied, the bundled carbon nanotube is dispersed to a suitable level, so that a carbon nanotube structure of an appropriate level may be formed, and dispersion stability may be improved.

The dispersion medium may be, for example, an amide-based polar organic solvent such as dimethylformamide (DMF), diethylformamide, dimethylacetamide (DMAc), and N-methylpyrrolidone (NMP); an alcohol such as methanol, ethanol, 1-propanol, 2-propanol (isopropyl alcohol), 1-butanol (n-butanol), 2-methyl-1-propanol (isobutanol), 2-butanol (sec-butanol), 1-methyl-2-propanol (tert-butanol), pentanol, hexanol, heptanol, and octanol; a glycol such as ethylene glycol, diethylene glycol, triethylene glycol, propylene glycol, 1,3-propanediol, 1,3-butanediol, 1,5-pentanediol, and hexylene glycol; a polyhydric alcohol such as glycerin, trimethylol propane, pentaerythritol, and sorbitol; a glycol ether such as ethylene glycol monomethyl ether, diethylene glycol monomethyl ether, triethylene glycol monomethyl ether, tetraethylene glycol monomethyl ether, ethylene glycol monoethyl ether, diethylene glycol monoethyl ether, triethylene glycol monoethyl ether, tetraethylene glycol monoethyl ether, ethylene glycol monobutyl ether, diethylene glycol monobutyl ether, triethylene glycol monobutyl ether, and tetraethylene glycol monobutyl ether; a ketone such acetone, methyl ethyl ketone, methyl propyl ketone, and cyclopentanone; and an ester such as ethyl acetate, γ-butyl lactone, and ε-propiactone. Any one thereof and a mixture of two or more thereof may be used, but the organic solvent is not limited thereto. More specifically, the dispersion medium may be N-methylpyrrolidone (NMP).

The solid content in the mixture may be 0.1 wt % to 20 wt %, specifically 1 wt % to 10 wt %. When the above range is satisfied is satisfied, the bundled carbon nanotube is dispersed to a suitable level, so that a carbon nanotube structure of an appropriate level may be formed, and dispersion stability may be improved.

In Step (b-2), a process of dispersing the bundle-type carbon nanotube in the mixture may be performed using a mixing device such as a sonification device, a homogenizer, a beads mill, a ball mill, a basket mill, an attrition mill, an all-purpose stirrer, a clear mixer, a spike mill, a TK mixer, or the like. Among the above, sonification may be preferable. In the sonification method, when ultrasonic waves of strong intensity are released into a solution, a large number of bubbles in a vacuum state are generated due to an extreme vibration, and these bubbles are instantaneously agglomerated together or enlarged, but are crushed violently and consecutively by an immediately following vibration. When bubbles are consecutively crushed as described above, strong shock waves are generated by the intense flow or vortex phenomenon of the solution, and through the energy of the shock waves, bundle-type carbon nanotube may be debundled. The sonification enables fine dispersion of a nano-level without cutting a single-walled carbon nanotube in a longitudinal direction in a bundle-type carbon nanotube. For this reason, the sonification method is preferable.

The sonification method may be as follows. Ultrasonic waves may be applied to the mixture to disperse solids in the mixture.

At this time, conditions under which the sonification method is performed are as follows.

The sonification may be performed with an output of 800 W to 1,500 W, specifically 800 W to 1,200 W. The sonification may be performed for 0.5 hours to 5 hours, specifically 1 hour to 3 hours. When the above range is satisfied, the bundle-type carbon nanotube may be separated to an appropriate level to form the carbon nanotube structure. The performance time means a total period of time during which sonification is applied. For example, if sonification has been performed for several times, the performance time means a total period of time during which the several times of sonification were performed.

The above conditions are for dispersing the bundle-type carbon nanotube to a suitable level to form a carbon nanotube structure in which 2 to 5,000 single-walled carbon nanotube units are bonded to each other side by side in a prepared conductive material dispersion. The above may be achieved only when the composition of the mixture, sonification conditions, and the like are strictly controlled. That is, in the formed carbon nanotube structure dispersion, there may be no or almost no single-walled carbon nanotube unit which is independently present in a single strand form, and most thereof may be present as the carbon nanotube structure described above.

In Step (c), the carbon nanotube structure dispersion and the core having the carbon layer formed thereon may be mixed.

Thereafter, in Step (d), the carbon nanotube structure in the carbon nanotube structure dispersion may be bonded to the carbon layer. After stirring, thereby uniformly mixing the core having the carbon layer formed thereon and the carbon nanotube structure dispersion, the dispersion medium is removed, and heat may be applied to crystallize the polyvinylidene fluoride. At this time, the applied heat may be, for example, 100° C. to 300° C., specifically 100° C. to 200° C. Accordingly, the carbon nanotube structure is firmly bonded to the carbon layer by the crystallized polyvinylidene fluoride, and the gelation of the polyvinylidene fluoride may be prevented during an aqueous dispersion process, and finally, a silicon-carbon composite negative electrode active material is obtained.

Negative Electrode

A negative electrode according to another embodiment of the present invention may include the silicon-carbon composite negative electrode active material of the embodiment described above. Specifically, the negative electrode may include a negative electrode active material layer, and the negative electrode active material layer may include the silicon-carbon composite negative electrode active material of the embodiment described above.

The negative electrode may be a free-standing negative electrode, in which case the negative electrode active material layer itself corresponds to a negative electrode. On the other hand, the negative electrode may include a negative electrode current collector supporting the negative electrode active material layer.

The negative electrode current collector is not particularly limited as long as it has conductivity without causing a chemical change in the battery. For example, as the negative electrode current collector, copper, stainless steel, aluminum, nickel, titanium, fired carbon, or aluminum or stainless steel that is surface-treated with one of carbon, nickel, titanium, silver, and the like may be used. Specifically, a transition metal which well adsorbs carbon such as copper and nickel well may be used as the negative electrode current collector.

The negative electrode active material layer may be disposed on one surface or both surfaces of the negative electrode current cathode collector. Naturally, in the case of the free-standing negative electrode, the negative electrode active material layer itself may be a negative electrode without a negative electrode current collector.

The negative electrode active material layer may include a silicon-carbon composite negative electrode active material, and the silicon-carbon composite negative electrode active material may be the silicon-carbon composite negative electrode active material of the embodiment described above.

The negative electrode active material layer may further include a carbon-based active material.

Typically, techniques using a silicon-based active material and a carbon-based active material in combination have been frequently used. However, when a carbon nanotube is used to serve as a conductive material together with the techniques, most of the carbon nanotube is positioned on the surface of the carbon-based active material by a n-n reaction between homogeneous carbon atoms, so that the silicon-based active material has no effect on the improvement of the conductive network of a negative electrode, and the conductivity between silicon-based active materials is degraded, so that there is a problem in that the capacity and lifespan of a battery are degraded.

In the present invention, a carbon nanotube structure may be firmly bonded to a carbon layer in the silicon-carbon composite negative electrode active material by polyvinylidene fluoride, and gelation may not occur in an aqueous dispersion process. Therefore, it is possible to suppress a phenomenon in which the carbon nanotube structure aggregates only on the surface of the carbon-based active material, and since the carbon nanotube structure may only behave on the silicon-carbon composite negative electrode active material, the efficiency of applying a conductive material may be greatly increased, and a tight and robust conductive network may be formed. Accordingly, the conductive network may be maintained even during repeated charging and discharging processes of a battery, and the capacity and lifespan of the battery may be improved.

The carbon-based material may be at least one selected from the group consisting of artificial graphite, natural graphite, and graphitized mesocarbon microbead. Specifically, in terms of being capable of effectively controlling the volume expansion of a negative electrode while maintaining a conductive network together with the above-described silicon-carbon composite negative electrode active material, the carbon-based active material is preferably artificial graphite, but is not limited thereto.

In the negative electrode, the silicon-carbon composite negative electrode active material and the carbon-based active material may be included at a weight ratio of 0.5:99.5 to 30:70, specifically at a weight ratio of 1:99 to 20:80. When the above range is satisfied, the excessive volume expansion of the silicon-carbon composite negative electrode active material may be suppressed, and the capacity of the battery may be improved.

In the negative electrode active material layer, the carbon nanotube structure may be included in an amount of 0.01 wt % to 0.5 wt %, specifically 0.01 wt % to 0.3 wt %, more specifically 0.01 wt % to 0.1 wt %. When the above range is satisfied, a highly durable conductive network may be effectively formed in the negative electrode while minimizing the content of the carbon nanotube structure.

The negative electrode active material layer may further include a binder. The binder is to ensure the adhesion force between silicon-carbon composite negative electrode active materials or between a silicon-carbon composite negative electrode active material and a current collector. Any binder commonly used in the art may be used, and the type thereof is not particularly limited. The binder may be, for example, a vinylidene fluoride-hexafluoropropylene copolymer (PVDF-co-HFP), polyvinyl alcohol, polyacrylonitrile, starch, hydroxypropyl cellulose, regenerated cellulose, polyvinylpyrrolidone, tetrafluoroethylene, polyethylene, polypropylene, an ethylene-propylene-diene monomer (EPDM), a sulfonated-EPDM, carboxymethyl cellulose (CMC), styrene-butadiene rubber (SBR), fluorine rubber, or various copolymers thereof, and the like, and any one thereof or a mixture of two or more thereof may be used. Particularly, when an aqueous dispersion process is used, the binder is preferably an aqueous binder such as SBR, CMC, or the like.

The binder may be included in an amount of 10 wt % or less based on a total weight of a negative electrode active material layer, and may preferably be included in an amount of 0.1 wt % to 5 wt %. When the content of the binder satisfies the above range, it is possible to implement excellent negative electrode adhesion force while minimizing an increase in negative electrode resistance.

The negative electrode active material layer may further include a conductive material. The conductive material may be at least one selected from the group consisting of fullerene, carbon black, carbon nanotube, graphene, plate-like graphite, and the like.

Secondary Battery

Next, a secondary battery according to another embodiment of the present invention will be described.

The secondary battery according to another embodiment of the present invention may include the negative electrode of the embodiment described above.

Specifically, the secondary battery may include the negative electrode, a positive electrode, a separator interposed between the positive electrode and the negative electrode, and an electrolyte. The negative electrode is the same as the negative electrode of the embodiment described above. Since the negative electrode has been described above, a detailed description thereof will be omitted.

The positive electrode may include a positive electrode current collector, and a positive electrode active material layer formed on the positive electrode current collector and including the positive electrode active material.

In the positive electrode, the positive electrode current collector is not particularly limited as long as it has conductivity without causing a chemical change in the battery. For example, stainless steel, aluminum, nickel, titanium, fired carbon, or aluminum or stainless steel that is surface-treated with one of carbon, nickel, titanium, silver, and the like may be used. Also, the positive electrode current collector may typically have a thickness of 3 μm to 500 μm, and microscopic irregularities may be formed on the surface of the positive electrode current collector to improve the adhesion of the positive electrode active material. For example, the positive electrode current collector may be used in various forms such as a film, a sheet, a foil, a net, a porous body, a foam, and a non-woven body.

The positive electrode active material may be a positive electrode active material commonly used in the art. Specifically, the positive electrode active material may be a layered compound such as a lithium cobalt oxide ($LiCoO_2$) and a lithium nickel oxide ($LiNiO_2$), or a compound substituted by one or more transition metals; a lithium iron oxide such as $LiFe_3O_4$; a lithium manganese oxide represented by Formula $Li_{1+c1}Mn_{2-c1}O_4$ ($0 \leq c1 \leq 0.33$), $LiMnO_3$, $LiMn_2O_3$, or $LiMnO_2$; a lithium copper oxide ($Li_2CuO_2$); a vanadium oxide such as $LiV_3O_8$, $V_2O_5$, and $Cu_2V_2O_7$; a Ni-site type lithium nickel oxide represented by Formula $LiNi_{1-c2}M_{c2}O_2$ (wherein M is at least one selected from the group consisting of Co, Mn, Al, Cu, Fe, Mg, B, and Ga, and $0.01 \leq c2 \leq 0.3$); a lithium manganese complex oxide represented by Formula $LiMn_{2-c3}M_{c3}O_2$ (wherein M is at least one selected from the group consisting of Co, Ni, Fe, Cr, Zn, and Ta, $0.01 \leq c3 \leq 0.1$) or Formula $Li_2Mn_3MO_8$ (wherein M is at least one selected from the group consisting of Fe, Co, Ni, Cu, Zn); $LiMn_2O_4$ in which a part of Li in the formula is substituted with an alkaline earth metal ion, and the like, but is not limited thereto. The positive electrode may be a Li-metal.

The positive electrode active material layer may include a positive electrode conductive material and a positive electrode binder, together with the positive electrode active material described above.

At this time, the positive electrode conductive material is used to impart conductivity to an electrode, and any positive electrode conductive material may be used without particular limitation as long as it has electronic conductivity without causing a chemical change in a battery to be constituted. Specific examples thereof may include graphite such as natural graphite or artificial graphite; a carbon-based material such as carbon black, acetylene black, Ketjen black, channel black, furnace black, lamp black, thermal black, and carbon fiber; metal powder or metal fiber of such as copper, nickel, aluminum, and silver; a conductive whisker such as a zinc oxide whisker and a potassium titanate whisker; a conductive metal oxide such as a titanium oxide; or a conductive polymer such as a polyphenylene derivative, and any one thereof or a mixture of two or more thereof may be used.

In addition, the positive electrode binder serves to improve the bonding between positive electrode active material particles and the adhesion between the positive electrode active material and the positive electrode current collector. Specific examples thereof may include polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene-butadiene rubber (SBR), fluorine rubber, or various copolymers thereof, and any one thereof or a mixture of two or more thereof may be used.

The separator is to separate the negative electrode and the positive electrode and to provide a movement path for lithium ions. Any separator may be used without particular limitation as long as it is a separator commonly used in a secondary battery. Particularly, a separator having excellent moisture-retention of an electrolyte as well as low resistance to ion movement in the electrolyte is preferable. Specifically, a porous polymer film, for example, a porous polymer film manufactured using a polyolefin-based polymer such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous non-woven fabric, for example, a non-woven fabric formed of glass fiber having a high melting point, polyethylene terephthalate fiber, or the like may be used. Also, a coated separator including a ceramic component or a polymer material may be used to secure heat resistance or mechanical strength, and may be selectively used in a single-layered or a multi-layered structure.

The electrolyte may be an organic liquid electrolyte, an inorganic liquid electrolyte, a solid polymer electrolyte, a gel-type polymer electrolyte, a solid inorganic electrolyte, a molten-type inorganic electrolyte, and the like, which may be used in the preparation of a lithium secondary battery, but is not limited thereto.

Specifically, the electrolyte may include a non-aqueous organic solvent and a lithium salt.

As the non-aqueous organic solvent, for example, an aprotic organic solvent, such as N-methyl-2-pyrrolidone, propylene carbonate, ethylene carbonate, butylene carbonate, dimethyl carbonate, diethyl carbonate, γ-butyrolactone, 1,2-dimethoxy ethane, tetrahydrofuran, 2-methyl tetrahydrofuran, dimethyl sulfoxide, 1,3-dioxolane, formamide, diemthylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate may be used.

Particularly, among the carbonate-based organic solvents, a cyclic carbonate such as ethylene carbonate and propylene carbonate may preferably be used since it is an organic solvent of high viscosity and has high dielectric constant to dissociate a lithium salt well. Such a cyclic carbonate may be more preferably used since when it is mixed with a linear carbonate of low viscosity and low dielectric constant such as dimethyl carbonate and diethyl carbonate in an appropriate ratio, an electrolyte having a high electric conductivity is prepared.

As the metal salt, a lithium salt may be used. The lithium salt is a material which is easily dissolved in the non-aqueous electrolyte solution. For example, as an anion of the lithium salt, one or more selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used.

In the electrolyte, in order to improve the lifespan properties of a battery, to suppress the decrease in battery capacity, and to improve the discharge capacity of the battery, one or more additives, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, and the like may be further included other than the above electrolyte components.

According to yet another embodiment of the present invention, a battery module including the secondary battery as a unit cell, and a battery pack including the same are provided. The battery module and the battery pack include the secondary battery which has high capacity, high rate properties, and cycle properties, and thus, may be used as a power source of a medium-and-large sized device selected from the group consisting of an electric car, a hybrid electric vehicle, a plug-in hybrid electric vehicle, and a power storage system.

Hereinafter, the present invention will be described in more detail with reference to specific embodiments.

Preparation Example 1: Preparation of Carbon Nanotube Structure Dispersion 0.4 parts by weight of a bundle-type carbon nanotube (specific surface area of 650 $m^2/g$) composed of single-walled carbon nanotube units having an average diameter of 1.5 nm and an average length of 5 μm and 2.0 parts by weight of polyvinylidene fluoride (weight average molecular weight: 685,000 g/mol. Standard Homo-polymer) were mixed with 97.6 parts by weight of N-methylpyrrolidone (NMP), which is a dispersion medium, to prepare a mixture having 2.4 wt % of solids.

The mixture was stirred by a sonification method to disperse the bundle-type carbon nanotube in the dispersion medium so as to prepare a carbon nanotube structure dispersion. At this time, sonification was performed for 1.5 hours with an output of 1,000 W. The carbon nanotube structure dispersion included a carbon nanotube structure in which 2 to 5,000 single-walled carbon nanotube units were bonded side by side. In the carbon nanotube structure dispersion, the carbon nanotube structure was 0.4 wt % and the modified polyvinylidene fluoride was 2.0 wt %.

Preparation Example 2: Preparation of Multi-Walled Carbon Nanotube Unit Dispersion 4.0 parts by weight of a bundle-type carbon nanotube (specific surface area of 185 m$^2$/g) composed of multi-walled carbon nanotube units having an average diameter of 10 nm and an average length of 1 µm and 0.8 parts by weight of carboxymethyl cellulose (weight average molecular weight: 100,000 g/mol, degree of substitution: 1.0) were mixed with 95.2 parts by weight of water, which is a dispersion medium, to prepare a mixture having 4.8 wt % of solids.

The mixture was stirred by a sonification method to disperse the bundle-type carbon nanotube in the dispersion medium so as to prepare a multi-walled carbon nanotube unit dispersion. At this time, sonification was performed for 1.5 hours with an output of 1,000 W. In the multi-walled carbon nanotube unit dispersion, the multi-walled carbon nanotube units were 4.0 wt % and the carboxymethyl cellulose was 0.8 wt %.

Preparation Example 3: Preparation of Multi-Walled Carbon Nanotube Unit Dispersion 4.0 parts by weight of a bundle-type carbon nanotube (specific surface area of 185 m$^2$/g) composed of multi-walled carbon nanotube units having an average diameter of 10 nm and an average length of 1 µm and 2.0 parts by weight of polyvinylidene fluoride (weight average molecular weight: 685,000 g/mol, standard homo-polymer) were mixed with 94.0 parts by weight of NMP, which is a dispersion medium, to prepare a mixture having 6.0 wt % of solids.

The mixture was stirred by a sonification method to disperse the bundle-type carbon nanotube in the dispersion medium so as to prepare a multi-walled carbon nanotube unit dispersion. At this time, sonification was performed for 1.5 hours with an output of 1,000 W. In the multi-walled carbon nanotube unit dispersion, the multi-walled carbon nanotube units were 4.0 wt % and the polyvinylidene fluoride was 2.0 wt %.

Preparation Example 4: Preparation of Carbon Black Dispersion 0.4 parts by weight of carbon black (Imerys Co., Ltd., Super C65) having an average particle diameter of 35 nm and 0.6 parts by weight of carboxymethyl cellulose (weight average molecular weight: 100,000 g/mol, degree of substitution: 1.0) were mixed with 99.0 parts by weight of water, which is a dispersion medium, to prepare a mixed solution having 1.0 wt % of solids. The mixed solution was introduced into a homogenizer, and then the mixed solution was applied with a pressure of 500 bar to allow the mixed solution to sequentially pass through a primary nozzle having a diameter of 300 nm and then a secondary nozzle having a diameter of 800 µm. In the conductive material dispersion, the carbon black was 0.4 wt %, and the carboxymethyl cellulose was 0.6 wt %.

Preparation Example 5: Preparation of Single-Walled Carbon Nanotube Unit Dispersion 0.2 parts by weight of a bundle-type carbon nanotube (specific surface area of 650 m$^2$/g) composed of single-walled carbon nanotube units having an average diameter of 1.5 nm and an average length of 5 µm and 4.0 parts by weight of polyvinylidene fluoride (weight average molecular weight: 220,000 g/mol, standard homo-polymer) were mixed with 95.8 parts by weight of NMP, which is a dispersion medium, to prepare a mixture having 4.2 wt % of solids.

The mixture was stirred by a sonification method to disperse the bundle-type carbon nanotube in the dispersion medium so as to prepare a single-walled carbon nanotube unit dispersion. At this time, sonification was performed for 5 hours with an output of 2,000 W.

In the single-walled carbon nanotube unit dispersion, the bundle-type carbon nanotube was 0.2 wt % and the polyvinylidene fluoride was 4.0 wt %. A carbon nanotube structure shown in Preparation Example 1 was not detected.

EXAMPLES AND COMPARATIVE EXAMPLES

Example 1: Manufacturing of Silicon-Carbon Composite Negative Electrode Active Material and Negative Electrode (1) Manufacturing of Silicon-Carbon Composite Negative Electrode Active Material On SiO(core) having an average particle diameter ($D_{50}$) of 6.6 µm, CVD (chemical vapor deposition) was performed at 1,000° C. using a Ar/CH$_4$ mixed gas to form a carbon layer (amorphous carbon layer) on the SiO. The carbon layer was 5 parts by weight based on 100 parts by weight of the core, and the carbon layer covers a portion of the surface of the SiO (see FIG. 1).

Meanwhile, a mixed solution was prepared by mixing the dispersion solution of Preparation Example 1 and the core having the carbon layer formed thereon such that the weight ratio of the core having the carbon layer formed thereon, the carbon nanotube structure, and polyvinylidene fluoride was 96.00:0.67:3.33 (0.69 parts by weight of the carbon nanotube structure based on 100 parts by weight of the core having the carbon layer formed thereon). The polyvinylidene fluoride was 3.47 parts by weight based on 100 parts by weight of the core having the carbon layer formed thereon.

Thereafter, the mixed solution was stirred, and then was subjected to vacuum distillation at 150° C. using a rotary evaporator to remove the dispersion medium (NMP). Thereafter, the mixed solution from which the dispersion medium was removed was heat treated in a 150° C. vacuum oven for 48 hours, and then naturally cooled for 24 hours with the oven turned off to manufacture a silicon-carbon composite negative electrode active material.

(2) Manufacturing of Negative Electrode

The silicon-carbon composite negative electrode active material, and artificial graphite ($D_{50}$: 21 µm) and plate-like graphite ($D_{50}$: 5.4 µm), which are carbon-based active materials, were used as a negative electrode active material. The negative electrode active material, and SBR and CMC (weight average molecular weight: 100,000 g/mol, degree of substitution: 1.0), which is a binder, were mixed with water, which is a solvent, to prepare a negative electrode slurry. The weight ratio of the negative electrode active material and the binder was 96.8:3.2, and the weight ratio of the silicon-carbon composite negative electrode active material, the artificial graphite, and the plate-like graphite was 15:80:5. In the binder, the weight ratio of SBR and CMC was 2.0:1.2. The carbon nanotube structure was included in the negative electrode active material layer in an amount of 0.1 wt %.

The above negative electrode slurry was applied with a loading of 160 mg/25 cm² on a copper (Cu) metal thin film having a thickness of 20 µm, which is a negative electrode current collector, and then dried. At this time, the temperature of circulated air was 70° C. Thereafter, the negative electrode current collector on which the slurry was applied and dried was roll-pressed, and then dried in a 130° C. vacuum oven for 8 hours to manufacture a negative electrode including a negative electrode active material layer.

Example 2: Manufacturing of Silicon-Carbon Composite Negative Electrode Active Material and Negative Electrode A silicon-carbon composite negative electrode active material and a negative electrode were manufactured in the same manner as in Example 1 except that when manufacturing the silicon-carbon composite negative electrode active material, a mixed solution was prepared by mixing the dispersion solution of Preparation Example 1 and the core having the carbon layer formed thereon such that the weight ratio of the core having the carbon layer formed thereon, the carbon nanotube structure, and the polyvinylidene fluoride was 99.59:0.07:0.34(0.069 parts by weight of the carbon nanotube structure and 0.345 parts by weight of the polyvinylidene fluoride based on 100 parts by weight of the core having the carbon layer formed thereon). The carbon nanotube structure was included in the negative electrode active material layer in an amount of 0.01 wt %.

Example 3: Manufacturing of Silicon-Carbon Composite Negative Electrode Active Material and Negative Electrode When manufacturing a silicon-carbon composite negative electrode active material, SiO (core) having an average particle diameter ($D_{50}$) of 6.6 µm and pitch were melted/stirred in a THF solvent, and then subjected to carbonization for 2 hours in an inert atmosphere to form a carbon layer (amorphous carbon layer). The carbon layer was 5 parts by weight based on 100 parts by weight of the core, and the carbon layer covers a portion of the surface of the SiO (see FIG. 2). Thereafter, the silicon-carbon composite negative electrode active material and a negative electrode were manufactured in the same manner as in Example 1. The carbon nanotube structure was included in the negative electrode active material layer in an amount of 0.1 wt %.

Example 4: Manufacturing of Silicon-Carbon Composite Negative Electrode Active Material and Negative Electrode A silicon-carbon composite negative electrode active material and a negative electrode were manufactured in the same manner as in Example 3 except that when manufacturing the silicon-carbon composite negative electrode active material, a mixed solution was prepared by mixing the dispersion solution of Preparation Example 1 and the core having the carbon layer formed thereon such that the weight ratio of the core having the carbon layer formed thereon, the carbon nanotube structure, and the polyvinylidene fluoride was 99.59:0.07:0.34 (0.069 parts by weight of the carbon nanotube structure and 0.345 parts by weight of the polyvinylidene fluoride based on 100 parts by weight of the core having the carbon layer formed thereon). The carbon nanotube structure was included in the negative electrode active material layer in an amount of 0.01 wt %.

Comparative Example 1: Manufacturing of Negative Electrode Active Material and Negative Electrode A negative electrode active material and a negative electrode were manufactured in the same manner as in Example 1 except that when preparing a mixed solution in Example 1, a core without a carbon layer was used.

In the negative electrode active material, the entire portion of the carbon nanotube structure was present wrapping the surface of the SiO while not being fixed on the surface of the negative electrode active material (see FIG. 3). The carbon nanotube structure was included in the negative electrode active material layer in an amount of 0.1 wt %.

Comparative Example 2: Manufacturing of Negative Electrode Active Material and Negative Electrode A silicon-carbon composite negative electrode active material and a negative electrode were manufactured in the same manner as in Example 2 except that when preparing a mixed solution in Example 2, a core without a carbon layer was used. In the negative electrode active material, the entire portion of the carbon nanotube structure was present wrapping the surface of the SiO while not being fixed on the surface of the negative electrode active material. The carbon nanotube structure was included in the negative electrode active material layer in an amount of 0.01 wt %.

Comparative Example 3: Manufacturing of Negative Electrode Active Material and Negative Electrode (1) Manufacturing of Negative Electrode Active Material
A silicon-based negative electrode active material was manufactured by performing CVD (chemical vapor deposition) at 1,000° C. using a Ar/$CH_4$ mixed gas on SiO(core) having an average particle diameter ($D_{50}$) of 6.6 µm, thereby forming a carbon layer (amorphous carbon layer) on the SiO. The carbon layer was 5 parts by weight based on 100 parts by weight of the core, and the carbon layer covers a portion of the surface of the SiO.
(2) Manufacturing of Negative Electrode
The silicon-based negative electrode active material, and artificial graphite ($D_{50}$: 21 µm) and plate-like graphite ($D_{50}$: 5.4 µm), which are carbon-based active materials, were used as a negative electrode active material. The negative electrode active material, SBR and CMC (weight average molecular weight: 100,000 g/mol, degree of substitution: 1.0), which is a binder, and the carbon nanotube structure dispersion of Preparation Example 1 were mixed with water to prepare a negative electrode slurry.

The weight ratio of the negative electrode active material, the carbon nanotube structure, and the binder was 96.7:0.1:3.2. In the negative electrode active material, the weight ratio of the silicon-based active material, the artificial graphite, and the plate-like graphite was 15:80:5. In the binder, the weight ratio of SBR and CMC was 2.0:1.2.

The above negative electrode slurry was applied with a loading of 160 mg/25 cm² on a copper (Cu) metal thin film having a thickness of 20 µm, which is a negative electrode current collector, and then dried. At this time, the temperature of circulated air was 70° C. Thereafter, the negative electrode current collector on which the slurry was applied and dried was roll-pressed, and then dried in a 130° C. vacuum oven for 8 hours to manufacture a negative electrode including a negative electrode active material layer. The carbon nanotube structure was included in the negative electrode active material layer in an amount of 0.1 wt %.

Comparative Example 4: Manufacturing of Negative Electrode Active Material and Negative Electrode A negative electrode active material and a negative electrode were manufactured in the same manner as in Comparative Example 3 except that the weight ratio of the negative electrode active material, the carbon nanotube structure, and the binder was 95.8:1.0:3.2. The carbon nanotube structure was included in the negative electrode active material layer in an amount of 0.01 wt %.

Comparative Example 5: Manufacturing of Negative Electrode (1) Manufacturing of Silicon-Based Negative Electrode Active Material On SiO (core) having an average particle diameter ($D_{50}$) of 6.6 μm, CVD (chemical vapor deposition) was performed at 1,000° C. using a Ar/$CH_4$ mixed gas to form a carbon layer (amorphous carbon layer) on the SiO. The carbon layer was 5 parts by weight based on 100 parts by weight of the core, and the carbon layer covers a portion of the surface of the SiO.

(2) Manufacturing of Negative Electrode

The silicon-based negative electrode active material, and artificial graphite ($D_{50}$: 21 μm) and plate-like graphite ($D_{50}$: 5.4 μm), which are carbon-based active materials, were used as a negative electrode active material. The negative electrode active material, SBR and CMC (weight average molecular weight: 100,000 g/mol, degree of substitution: 1.0), which is a binder, and the multi-walled carbon nanotube unit dispersion of Preparation Example 2 were mixed with water, which is a solvent, to prepare a negative electrode slurry. The weight ratio of the negative electrode active material, multi-walled carbon nanotube units, and the binder was 95.8:1.0:3.2, and the weight ratio of the silicon-carbon negative electrode active material, the artificial graphite, and the plate-like graphite was 15:80:5. In the binder, the weight ratio of SBR and CMC was 2.0:1.2.

The above negative electrode slurry was applied with a loading of 160 mg/25 $cm^2$ on a copper (Cu) metal thin film having a thickness of 20 μm, which is a negative electrode current collector, and then dried. At this time, the temperature of circulated air was 70° C. Thereafter, the negative electrode current collector on which the slurry was applied and dried was roll-pressed, and then dried in a 130° C. vacuum oven for 8 hours to manufacture a negative electrode including a negative electrode active material layer. The multi-walled carbon nanotube units were included in the negative electrode active material layer in an amount of 1.0 wt %.

Comparative Example 6: Manufacturing of Negative Electrode

A negative electrode was manufactured in the same manner as in Comparative Example 5 except that the carbon black dispersion of Preparation Example 4 was used instead of the multi-walled carbon nanotube unit dispersion of Preparation Example 2. The carbon black was included in the negative electrode active material in an amount of 1.0 wt %.

Comparative Example 7: Manufacturing of Negative Electrode Active Material and Negative Electrode A negative electrode active material and a negative electrode were manufactured in the same manner as in Example 1 except that the multi-walled carbon nanotube unit dispersion of Preparation Example 3 was used instead of the carbon nanotube structure dispersion of Preparation Example 1.

The weight ratio of the core having the carbon layer formed thereon, the multi-walled carbon nanotube units, and the polyvinylidene fluoride was 90.50:6.33:3.17 (7.0 parts by weight of the multi-walled carbon nanotube units and 3.5 parts by weight of the polyvinylidene fluoride based on 100 parts by weight of the core having the carbon layer formed thereon). The multi-walled carbon nanotube units were included in the negative electrode active material layer in an amount of 1.0 wt %.

Comparative Example 8: Manufacturing of Negative Electrode Active Material and Negative Electrode A negative electrode active material and a negative electrode were manufactured in the same manner as in Example 1 except that the single-walled carbon nanotube unit dispersion of Preparation Example 5 was used instead of the carbon nanotube structure dispersion of Preparation Example 1.

The weight ratio of the core having the carbon layer formed thereon, the single-walled carbon nanotube units, and the polyvinylidene fluoride was 92.88:0.65:6.47 (0.70 parts by weight of the single-walled carbon nanotube units and 6.97 parts by weight of the polyvinylidene fluoride based on 100 parts by weight of the core having the carbon layer formed thereon). The single-walled carbon nanotube units were included in the negative electrode active material layer in an amount of 0.1 wt %.

TABLE 1

|  | Average length (μm) | Average diameter (nm) |
| --- | --- | --- |
| Carbon nanotube structures of Examples 1 to 4 and Comparative Examples 1 to 4 | 26.5 | 100 |
| Multi-walled carbon nanotube units of Comparative Example 5 and Comparative Example 7 | 1.3 | 10 |
| Carbon black of Comparative Example 6 | 0.8 | Particle diameter: 35 |
| Single-walled carbon nanotube unit of Comparative Example 8 | 0.9 | 1.5 |

The carbon nanotube structure shows a rope form in which single-walled carbon nanotube units having a diameter of about 1.5 nm are bonded to each other side by side. The average length and the average diameter correspond to average length and diameter values of the top 100 targets with larger lengths or diameters and the bottom 100 targets with smaller lengths or diameters when a manufacture negative electrode is observed through a TEM.

TABLE 2

| | Whether carbon nanotube structure is bonded to the surface of negative electrode active material | Content (parts by weight) of carbon nanotube structure in negative electrode active material layer | Specific area surface (m²/g) of negative electrode active material |
|---|---|---|---|
| Example 1 | ○ | 0.1 | 5.2 |
| Example 2 | ○ | 0.01 | 5.1 |
| Example 3 | ○ | 0.1 | 2.3 |
| Example 4 | ○ | 0.01 | 2.2 |
| Comparative Example 1 | ○ | 0.1 | 1.7 |
| Comparative Example 2 | ○ | 0.01 | 1.7 |
| Comparative Example 3 | X (Simple mixing) | 0.1 | 4.6 |
| Comparative Example 4 | X (Simple mixing) | 0.01 | 4.6 |
| Comparative Example 5 | X (Multi-walled carbon nanotube unit) | 1.0 (Content of multi-walled carbon nanotube unit) | 4.6 |
| Comparative Example 6 | X (Carbon black) | 1.0 (Content of carbon black) | 4.6 |
| Comparative Example 7 | ○ (Multi-walled carbon nanotube unit) | 1.0 (Multi-walled carbon nanotube unit) | 7.1 |
| Comparative Example 8 | ○ (Single-walled carbon nanotube unit) | 0.1 (Single-walled carbon nanotube unit) | 5.3 |

In Table 2 above, the negative electrode active material of each of Examples 1 to 4 means a silicon-carbon composite negative electrode active material.

EXPERIMENTAL EXAMPLES

Experimental Example 1: Observation of Negative Electrode

Figure 2:
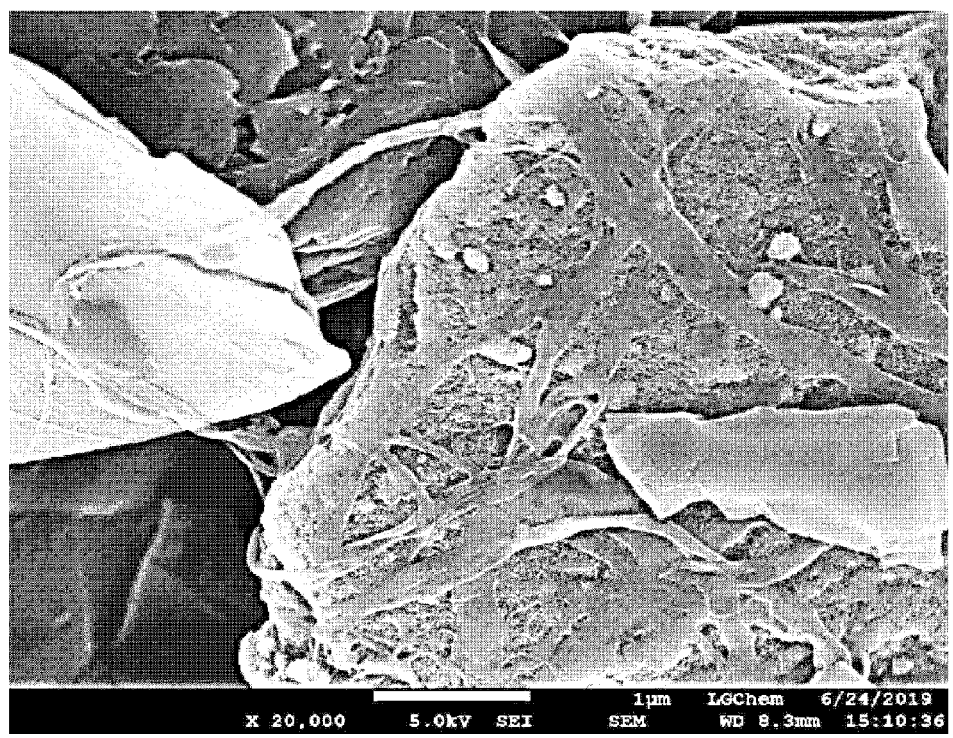
Figure 5:
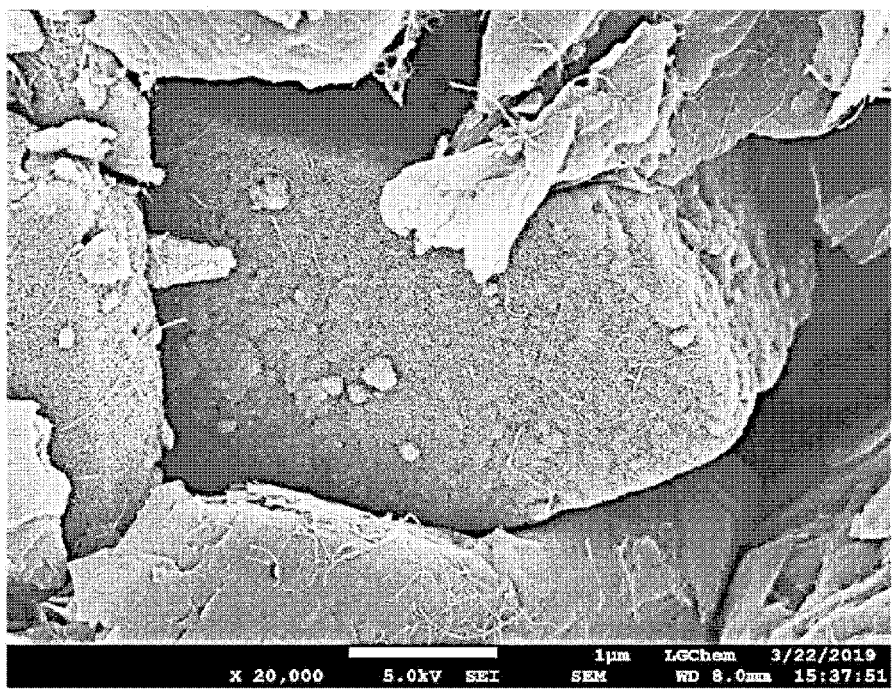
FIG. 5 is an SEM photograph of a negative electrode of Comparative Example 3.
Figure 6:
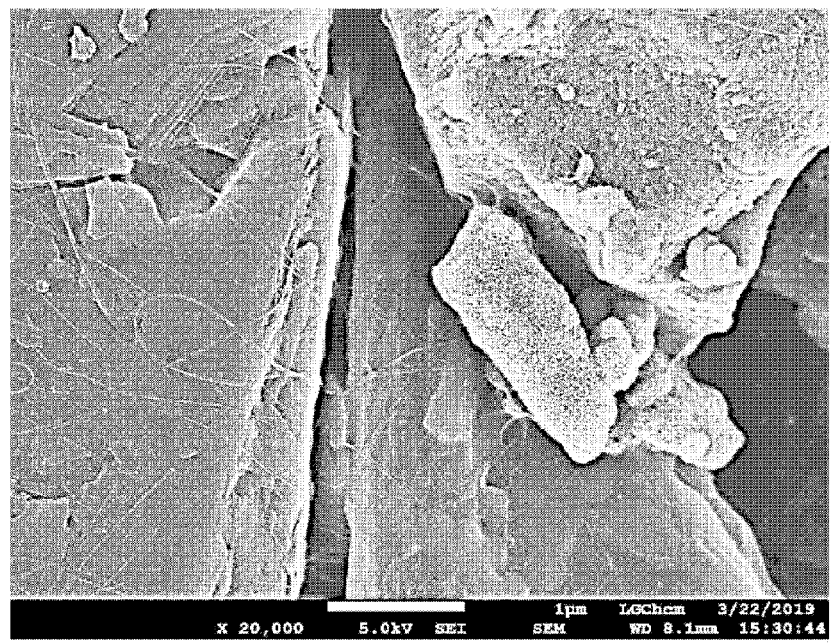
FIG. 6 is an SEM photograph of a negative electrode of Comparative Example 5.
Figure 7:
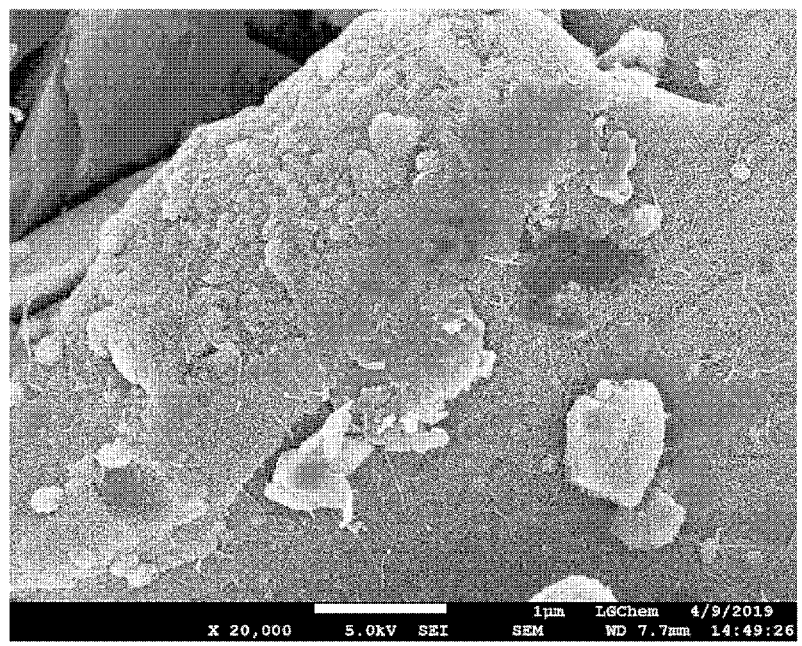
FIG. 7 is an SEM photograph of a negative electrode of Comparative Example 7.

The negative electrode active materials of the negative electrodes of Examples 1, 3, and Comparative Examples 1, 3, 5, 7 are observed through scanning electron microscope. FIG. 1 and FIG. 2 are SEM photographs of the negative electrode of Example 1 of the present invention. FIG. 3 includes SEM photographs of the negative electrode of Example 3 of the present invention. FIG. 4 includes SEM photographs of the negative electrode of Comparative Example 1. FIG. 5 is an SEM photograph of the negative electrode of Comparative Example 3. FIG. 6 is an SEM photograph of the negative electrode of Comparative Example 5. FIG. 7 is an SEM photograph of the negative electrode of Comparative Example 7.

Referring to FIG. 1, FIG. 2, and FIG. 3, a carbon nanotube structure in which 2 to 5,000 single-walled carbon nanotube units are bonded side by side is observed, and it can be seen that the carbon nanotube structure is bonded to the surface of an amorphous carbon layer. In addition, it can be seen that only a portion of the carbon nanotube structure is bonded to the amorphous carbon layer, and the rest thereof is in contact with an adjacent negative electrode active material.

In addition, in the silicon-carbon composite negative electrode active materials of Examples, the polyvinylidene fluoride coated at least a portion of the carbon nanotube structure, and a portion of the carbon nanotube structure was bonded to the carbon layer due to the crystallization of the polyvinylidene fluoride. In addition, when confirmed with the scanning electron microscope, it can be seen that the carbon nanotube structure is present linearly protruding from the carbon layer. More specifically, an average of 2.5 carbon nanotube structures were included in the silicon-carbon composite negative electrode active material. This corresponds to an average value obtained after observing 500 silicon-carbon composite negative electrode active materials in the negative electrode with an SEM and confirming the number of the carbon nanotube structures present on the surface thereof. In addition, a part of the carbon nanotube structure was bonded to the carbon layer, and the other part of the carbon nanotube structure protruded without being directly bonded to the carbon layer and was present in a beard shape.

Furthermore, when comparing FIG. 2 and FIG. 5, in the case of Comparative Examples 3 and 4, the carbon nanotube structure is not firmly bonded to the amorphous carbon layer unlike in Example 1, so that most carbon nanotube structures were observed on the carbon-based active material. Also, in FIG. 6, it can be seen that most multi-walled carbon nanotube units were present only on the carbon-based active material. In FIG. 7, only short multi-walled carbon nanotube units were present on the amorphous carbon layer, and a carbon nanotube structure was not observed.

Experimental Example 2: Evaluation of
High-Temperature Capacity Retention Rate
(High-Temperature Lifespan Properties)

Using the negative electrodes of Examples and Comparative Examples, batteries were each manufactured as follows.

Li[Ni$_{0.6}$Mn$_{0.2}$Co$_{0.2}$]O$_2$ was used as a positive electrode active material. The positive electrode active material, carbon black, which is a conductive material, polyvinylidene fluoride (PVdF), which is a binder, were mixed at a weight ratio of 94:4:2 with N-methyl-2-pyrrolidone, which is a solvent, to prepare a positive electrode slurry.

The prepared positive electrode slurry was applied on an aluminum metal thin film having a thickness of 15 μm, which is a positive electrode current collector, and then dried. At this time, the temperature of circulated air was 110° C. Thereafter, the aluminum metal thin film applied with the positive electrode slurry and then dried was roll-pressed, and then dried in a vacuum oven at 130° C. for 2 hours to form a positive electrode active material layer.

The negative electrode of each of Examples 1 to 4 and Comparative Examples 1 and 8, the positive electrode manufactured above, and a porous polyethylene separator were assembled in a stacking manner, and the assembled battery was injected with an electrolyte solution (ethylene carbonate (EC)/ethyl methyl carbonate (EMC)=1/2 (volume ratio), lithium hexa fluoro phosphate (1 mole of LiPF$_6$) to manufacture a lithium secondary battery.

Each of the lithium secondary batteries were subjected to charge-discharge under the following conditions.

Charge condition: Charging to 4.25 V with a 0.5 C constant current, and then charging to 4.2 V until a 0.1 C current rate is achieved.

Discharge condition: Discharging to 2.8 V with a 0.5 C current rate.

The above charge and discharge were set as one cycle, and 100 cycles were performed at 45° C. Thereafter, the discharge capacity after 100 cycles (capacity retention rate) based on 100% of the discharge capacity after one cycle was evaluated and shown in Table 3.

TABLE 3

|  | Example 1 | Comparative Example 7 | Comparative Example 8 |
| --- | --- | --- | --- |
| High-temperature capacity retention rate (%) | 98.9 | 85.2 | 96.1 |

TABLE 4

|  | Example 1 | Comparative Example 3 |
| --- | --- | --- |
| High-temperature capacity retention rate (%) | 98.9 | 93.4 |

|  | Example 2 | Comparative Example 4 |
| --- | --- | --- |
| High-temperature capacity retention rate (%) | 89.1 | 88.1 |

TABLE 5

|  | Example 1 | Comparative Example 1 |
| --- | --- | --- |
| High-temperature capacity retention rate (%) | 98.9 | 95.3 |

|  | Example 2 | Comparative Example 2 |
| --- | --- | --- |
| High-temperature capacity retention rate (%) | 89.1 | 85.7 |

TABLE 6

|  | Example 1 | Comparative Example 5 | Comparative Example 6 |
| --- | --- | --- | --- |
| High-temperature capacity retention rate (%) | 98.9 | 84.3 | 79.2 |

TABLE 7

|  | Example 1 | Example 3 |
| --- | --- | --- |
| High-temperature capacity retention rate (%) | 98.9 | 97.2 |

|  | Example 2 | Example 4 |
| --- | --- | --- |
| High-temperature capacity retention rate (%) | 89.1 | 88.5 |

Referring to Tables above, it is possible to compare Example 1 and Comparative Example 8 as a comparison between experiments using the same content of a carbon-based material (a carbon nanotube structure, and single-walled carbon nanotube units) based on 100 parts by weight of the silicon-carbon composite negative electrode active material. In this case, it can be seen that Example 1 has a much higher high-temperature capacity retention rate. This is because a carbon nanotube structure is firmly bonded to a carbon layer, so that even when the silicon-carbon composite negative electrode active material of the present invention is used in combination with a carbon-based active material, the carbon nanotube structure may remain bonded to the silicon-carbon composite negative electrode active material of the present invention. In addition, the effect is obtained because a carbon nanotube structure is long and may be present protruding from a silicon-carbon composite negative electrode active material (it is not that the carbon nanotube structure only surrounds the silicon-carbon composite negative electrode active material to which it is bonded), so that a conductive network may be formed with a silicon-carbon composite negative electrode active material and a carbon-based active material, which are adjacent, and also with a silicon-carbon composite negative electrode active material and a carbon-based active material, which are relatively distant. On the contrary, in Comparative Example 8, there are only single-strand single-walled carbon nanotube units, not a carbon nanotube structure, and the units are rather short, so that it is difficult for the conductive network as described above to be formed.

Meanwhile, when comparing Example 1 and Comparative Example 7, in FIG. 7 a relatively large amount of multi-walled carbon nanotube units were used in order to ensure the conductivity of the negative electrode, but since a multi-walled carbon nanotube was short and the multi-walled carbon nanotube was mainly present only on the surface of the carbon-based active material, so that it can be seen that lifespan properties are poor.

In addition, when comparing Example 1 and Comparative Example 3, or Example 2 and Comparative Example 4, it can be seen that Comparative Example 3 having a simple mixed form in which the carbon layer and the carbon nanotube structure were not firmly bonded to each other by polyvinylidene fluoride had poorer lifespan properties than Example 1, and Comparative Example 4 having a simple mixed form had poorer lifespan properties than Example 2.

Furthermore, when comparing Example 1 and Comparative Example 1, and Example 2 and Comparative Example 2 which all included the same content of the carbon nanotube structure, it can be seen that Comparative Example 1 without a carbon layer had poorer lifespan properties than Example 1, and Comparative Example 2 without a carbon layer had poorer lifespan properties than Example 2. This is because a carbon layer is not present as a medium which may allow a carbon nanotube structure to be bonded to a core, so that the carbon nanotube structure can only be present mainly in a carbon-based active material, resulting in poor uniformity and durability of a conductive network.

In addition, looking at Example 1, Comparative Example 5, and Comparative Example 6, it can be seen that Comparative Example 5 and Comparative Example 6 in which carbon black or multi-walled carbon nanotube units were used, not a carbon nanotube structure, and in which a negative electrode active material was not manufactured in the form in which the carbon black or the multi-walled carbon nanotube units were bonded to a carbon layer, had a very low capacity retention rate.

Meanwhile, when comparing Example 1 and Example 3, and Example 2 and Example 4 which all included the same content of the carbon nanotube structure, it can be see that Examples 1 and 2 in which only a portion of the surface of the core was coated (the specific surface area of the silicon-carbon composite negative electrode active material was relatively large) had excellent lifespan properties compared to Examples 3 and 4.

The invention claimed is:

1. A silicon-carbon composite negative electrode active material comprising:
a core containing $SiO_X$ (0≤X<2);
a carbon layer covering at least a portion of the surface of the core;
a carbon nanotube structure positioned on the carbon layer; and
a polyvinylidene fluoride coating at least a portion of the carbon nanotube structure, wherein the carbon nanotube structure has a structure formed by arranging and bonding 2 to 5,000 single-walled carbon nanotube units side by side in a single plane, and a portion of the carbon nanotube structure is bonded to the carbon layer,
wherein the polyvinylidene fluoride is present in a crystallized state in the silicon-carbon composite negative electrode active material.

2. The silicon-carbon composite negative electrode active material of claim 1, wherein an average diameter of the carbon nanotube structure is 2 nm to 200 nm.

3. The silicon-carbon composite negative electrode active material of claim 1, wherein the carbon nanotube structure is formed by arranging and bonding 2 to 500 single-walled carbon nanotube units side by side.

4. The silicon-carbon composite negative electrode active material of claim 1, wherein an average length of the carbon nanotube structure is 1 m to 100 m.

5. The silicon-carbon composite negative electrode active material of claim 1, wherein the single-walled carbon nanotube units are included in the carbon nanotube structure in an amount of 95 wt % to 100 wt %.

6. The silicon-carbon composite negative electrode active material of claim 1, wherein a number of the carbon nanotube structure included in the negative electrode active material is 1 to 100.

7. The silicon-carbon composite negative electrode active material of claim 1, wherein the carbon nanotube structure is included in an amount of 0.05 parts by weight to 5.0 parts by weight based on 100 parts by weight of the core having the carbon layer formed thereon.

8. The silicon-carbon composite negative electrode active material of claim 1, wherein the carbon layer comprises at least any one of crystalline carbon or amorphous carbon.

9. The silicon-carbon composite negative electrode active material of claim 1, wherein the carbon layer is included in an amount of 0.1 parts by weight to 20 parts by weight based on 100 parts by weight of the core.

10. The silicon-carbon composite negative electrode active material of claim 1, wherein the polyvinylidene fluoride is included in an amount of 0.1 parts by weight to 30 parts by weight based on 100 parts by weight of the core having the carbon layer formed thereon.

11. The silicon-carbon composite negative electrode active material of claim 1, wherein a specific surface area thereof is 0.5 $m^2$/g to 50 $m^2$/g.

12. A negative electrode comprising the silicon-carbon composite negative electrode active material of claim 1.

13. The negative electrode of claim 12, further comprising a carbon-based active material.

14. A secondary battery comprising the negative electrode of claim 12.

* * * * *